(12) United States Patent
Ho

(10) Patent No.: US 10,572,076 B2
(45) Date of Patent: Feb. 25, 2020

(54) TOUCH DISPLAY PANEL AND ASSOCIATED DRIVING CIRCUIT AND DRIVING METHOD

(71) Applicant: ILI TECHNOLOGY CORP., Hsinchu County (TW)

(72) Inventor: Kai-Ting Ho, Hsinchu Hsien (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 242 days.

(21) Appl. No.: 15/058,219

(22) Filed: Mar. 2, 2016

(65) Prior Publication Data

US 2017/0123529 A1 May 4, 2017

(30) Foreign Application Priority Data

Nov. 3, 2015 (TW) .............................. 104136125 A

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC ......... G06F 3/044; G06F 3/041; G06F 3/0412
See application file for complete search history.

(56) References Cited

U.S. PATENT DOCUMENTS

| | | | | |
|---|---|---|---|---|
| 9,285,913 B1* | 3/2016 | Kang | .................... | G06F 3/0412 |
| 2008/0309631 A1* | 12/2008 | Westerman | ........... | G06F 1/3203 |
| | | | | 345/173 |
| 2012/0056835 A1* | 3/2012 | Choo | .................... | G06F 3/0412 |
| | | | | 345/173 |
| 2012/0154326 A1* | 6/2012 | Liu | ........................ | G06F 3/0412 |
| | | | | 345/174 |
| 2013/0314369 A1* | 11/2013 | Liu | ........................ | G06F 3/0412 |
| | | | | 345/174 |
| 2014/0320454 A1* | 10/2014 | Hotelling | .......... | G02F 1/134363 |
| | | | | 345/174 |
| 2016/0098117 A1* | 4/2016 | Ouh | ........................ | G06F 3/044 |
| | | | | 345/174 |

(Continued)

FOREIGN PATENT DOCUMENTS

| | | |
|---|---|---|
| CN | 101866228 | 10/2010 |
| CN | 102135837 | 7/2011 |

(Continued)

OTHER PUBLICATIONS

"Office Action of China Counterpart Application", dated Mar. 8, 2019, p. 1-p. 9.

*Primary Examiner* — Ricardo Osorio
(74) *Attorney, Agent, or Firm* — JCIPRNET

(57) ABSTRACT

A driving circuit for a touch control panel, that selectively operates in a display mode or a touch mode, includes a display data generating circuit and a touch control circuit. When the driving circuit operates in the display mode, the display data generating circuit transmits display data to multiple data lines of a pixel array of the touch display panel. When the driving circuit operates in the touch mode, the touch control circuit transmits a touch driving signal to the multiple data lines, and performs touch detection by detecting capacitance changes on the multiple data lines.

15 Claims, 4 Drawing Sheets

(56) References Cited

U.S. PATENT DOCUMENTS

2016/0109992 A1* 4/2016 Hung .................... G06F 3/0412
                                                              345/174
2018/0088715 A1* 3/2018 Lee ..................... G02F 1/13338

FOREIGN PATENT DOCUMENTS

| CN | 102402330   | 4/2012 |
|----|-------------|--------|
| CN | 103116429   | 5/2013 |
| CN | 103293737   | 9/2013 |
| CN | 103677378   | 3/2014 |
| CN | 104460082   | 3/2015 |
| TW | 201525828 A | 7/2015 |

* cited by examiner

TOUCH DISPLAY PANEL AND ASSOCIATED DRIVING CIRCUIT AND DRIVING METHOD

This application claims the benefit of Taiwan application Serial No. 104136125, filed Nov. 3, 2015, the subject matter of which is incorporated herein by reference.

BACKGROUND OF THE INVENTION

Field of the Invention

The invention relates in general to a touch display panel, and more particularly to an in-cell touch display panel, and associated driving circuit and driving method.

Description of the Related Art

In a conventional in-cell touch display panel, a display mode and a touch mode are constantly alternated. When a panel displays different colors/brightness levels, rotation angles of liquid crystal molecules are different and that results in different dielectric constants. Thus, capacitance between common electrodes and gate/data lines also changes along with the different colors/brightness levels of images, hence resulting in noise interference and affecting the accuracy of subsequent touch detection. Further, in certain technologies for eliminating such noise interference, this issue is solved by a design of common electrodes coordinating with an associated signal control mechanism. However, these associated technologies involve a change in the design of the mask and thus cause increased costs.

SUMMARY OF THE INVENTION

It is an object of the present invention to provide a touch display panel and associated driving circuit and driving method. By performing touch detection in an idle timeslot of displayed images and with minimal changes made to the design architecture of a panel, the present invention solves issues of the prior art.

According to an embodiment of the present invention, a driving circuit of a touch display panel is disclosed. The driving circuit selectively operates in a display mode or a touch mode, and includes a display data generating circuit and the touch control circuit. When the driving circuit operates in the display mode, the display data generating circuit transmits display data to multiple data lines of a pixel array of the touch display panel. When the driving circuit operates in the touch mode, the touch control circuit transmits a touch driving signal to the multiple data lines, and performs touch detection by detecting capacitance changes on the multiple data lines.

According to another embodiment of the present invention, a driving method for a touch display panel includes: selectively operating in a display mode or a touch mode; when operating in the display mode, transmitting display data to multiple data lines of a pixel array of the touch display panel; and when operating in the touch mode, transmitting a touch driving signal to the multiple data lines, and performing touch detection by detecting capacitance changes on the multiple data lines.

According to another embodiment of the present invention, a touch display panel includes a pixel array, a common electrode and a driving circuit. The driving circuit is coupled between the pixel array and the common electrode, and selectively operates in a display mode or a touch mode. When the driving circuit operates in the display mode, the driving circuit transmits display data to multiple data lines of the pixel array. When the driving circuit operates in the touch mode, the driving circuit transmits a touch driving signal to the multiple data lines, and performs touch detection by detecting capacitance changes on the multiple data lines.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
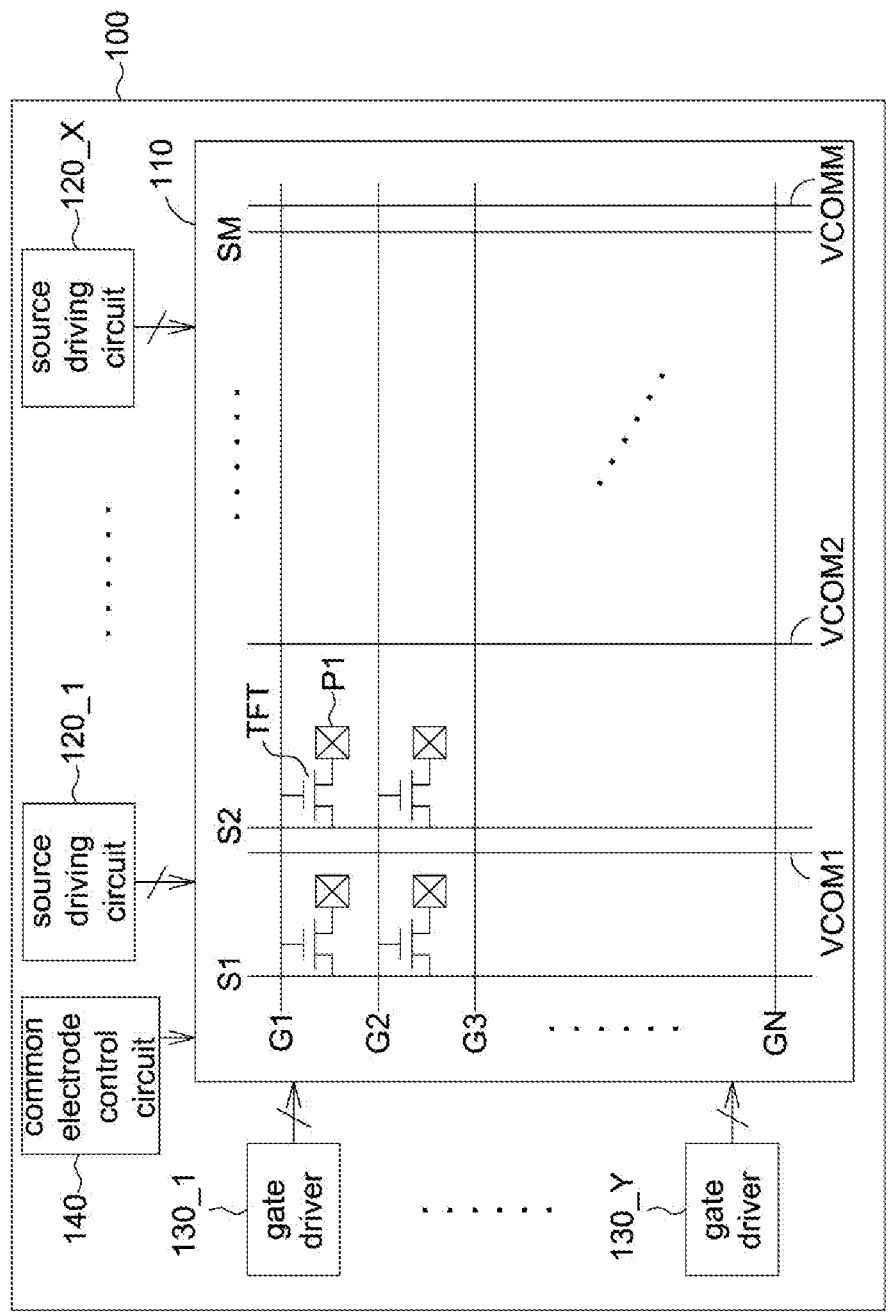
FIG. 1 is a schematic diagram of a touch display panel according to an embodiment of the present invention.

FIG. 1 shows a schematic diagram of a touch display panel 100 according to an embodiment of the present invention. As shown in FIG. 1, the touch display panel 100 includes a pixel array 110 and a driving circuit.

In the embodiment, the pixel array 110 includes gate lines G1 to GN, data lines S1 to SM that intersect the gate lines G1 to GN, multiple transistors TFT and multiple pixel electrodes P1 of the transistors TFT. For example but not limited to, in this embodiment, the driving circuit includes source driving circuits 120_1 to 120_X and gate drivers 130_1 to 130Y. In other embodiments, the driving circuit may include one single source driver or one single gate driver, or may be integrated in one single chip, and the gate drivers may be directly manufactured on a glass substrate by gate on array (GOA) technologies.

In the embodiment, the touch display panel 100 is an in-cell in-plane switching (IPS) touch display panel. Thus, FIG. 1 further depicts multiple strip-like common electrodes VCOM1 to VCOMM, which are connected to one another and are controlled by a common electrode control circuit 140. Voltage differences between the pixel electrodes P1 of the common electrodes VCOM1 to VCOMM may be utilized to control rotation angles of liquid crystal molecules. It should be noted that, the architecture of an IPS touch display panel is generally known to one person skilled in the art, and primary features of the present invention are operations of the driving circuit. Thus, details associated with the architecture of the touch display panel in FIG. 1 are omitted herein.

Figure 2:
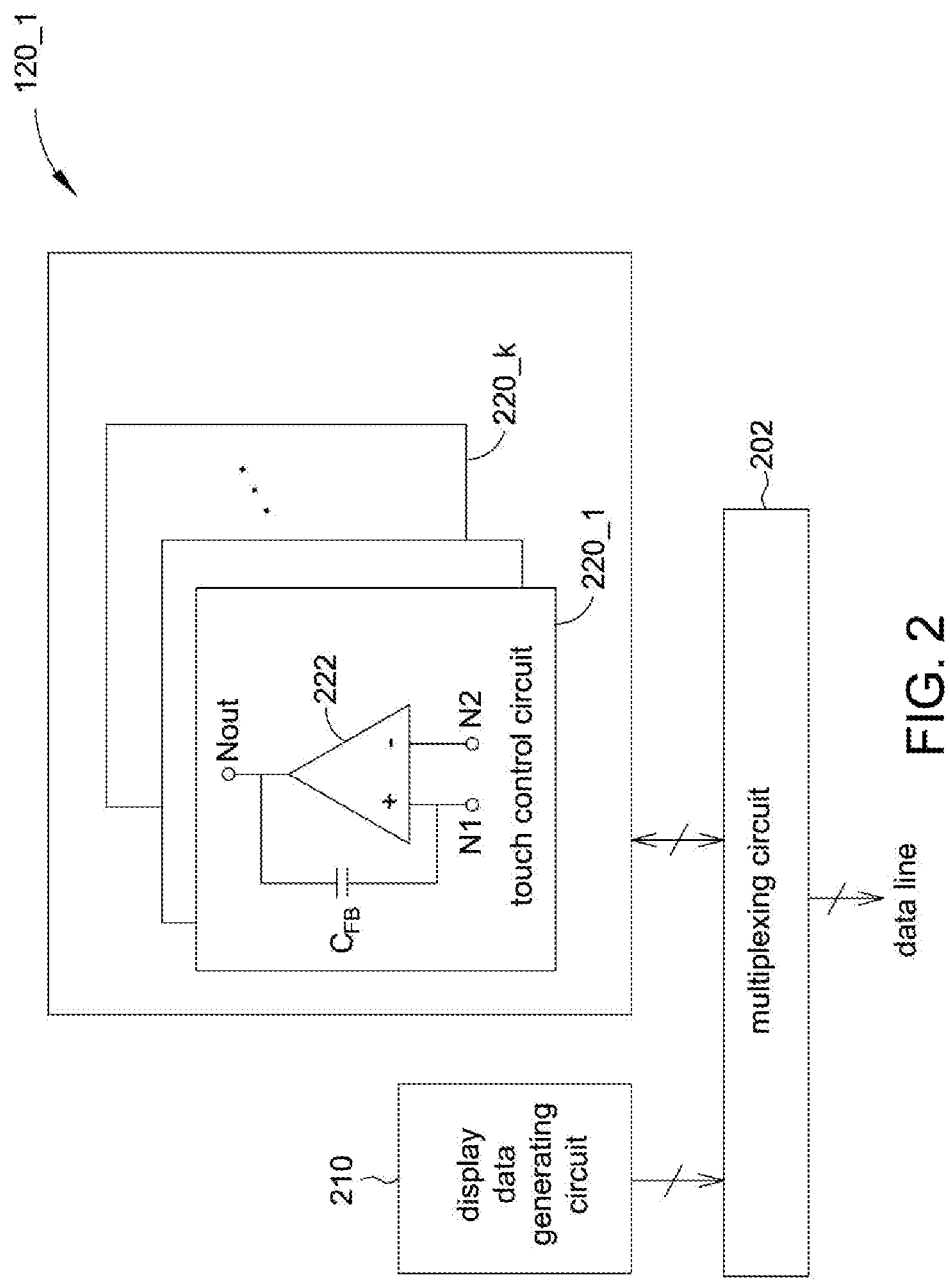
FIG. 2 is a schematic diagram of a source driving circuit according to an embodiment of the present invention.

FIG. 2 shows a schematic diagram of the source driving circuit 120_1 according to an embodiment of the present invention. The source driving circuits 120_2 to 120_X in FIG. 1 may also adopt the architecture shown in FIG. 2. As shown in FIG. 2, the source driving circuit 120_1 includes a multiplexing circuit 202, a display data generating circuit 210, and multiple touch control circuits 220_1 to 220_K. Each of the touch control circuits 220_1 to 220_K includes an operational amplifier 222, a feedback capacitor $C_{FB}$ and three nodes N1, N2 and Nout. In FIG. 2, the multiplexing circuit 202 selectively connects the display data generating circuit 210 or the touch control circuits 220_1 to 220_K to the data lines S1 to SM. The architecture of the display data generating circuit 210 is as that of a conventional source driver. One person skilled in the art can understand the architecture and operations of a conventional source driver, and thus details of the display data generating circuit 210 are omitted herein. Further, the node N1 in each of the touch control circuits 220_1 to 220_K is for connecting to multiple data lines. For example, the node N1 of the touch control circuit 220_1 is simultaneously connected to the data lines S1 to S10 via the multiplexing circuit 202, the node N1 of the touch control circuit 220_2 is simultaneously connected to the data lines S11 to S20 via the multiplexing circuit 202, the node N1 of the touch control circuit 220_3 is simultaneously connected to the data lines S21 to S30 via the multiplexing circuit 202, and so forth. The node N2 of each of the touch control circuits 220_1 to 220_K is for receiving a touch driving signal for performing touch detection, such that the node N1 and the node N2 may have the same signal waveform to accordingly transmit the touch driving signal to the data lines S1 to SM. The node Nout of each of the touch control circuit 220_1 to 220_K is for detecting a capacitance change on the data lines to generate a touch detection result.

Figure 3:
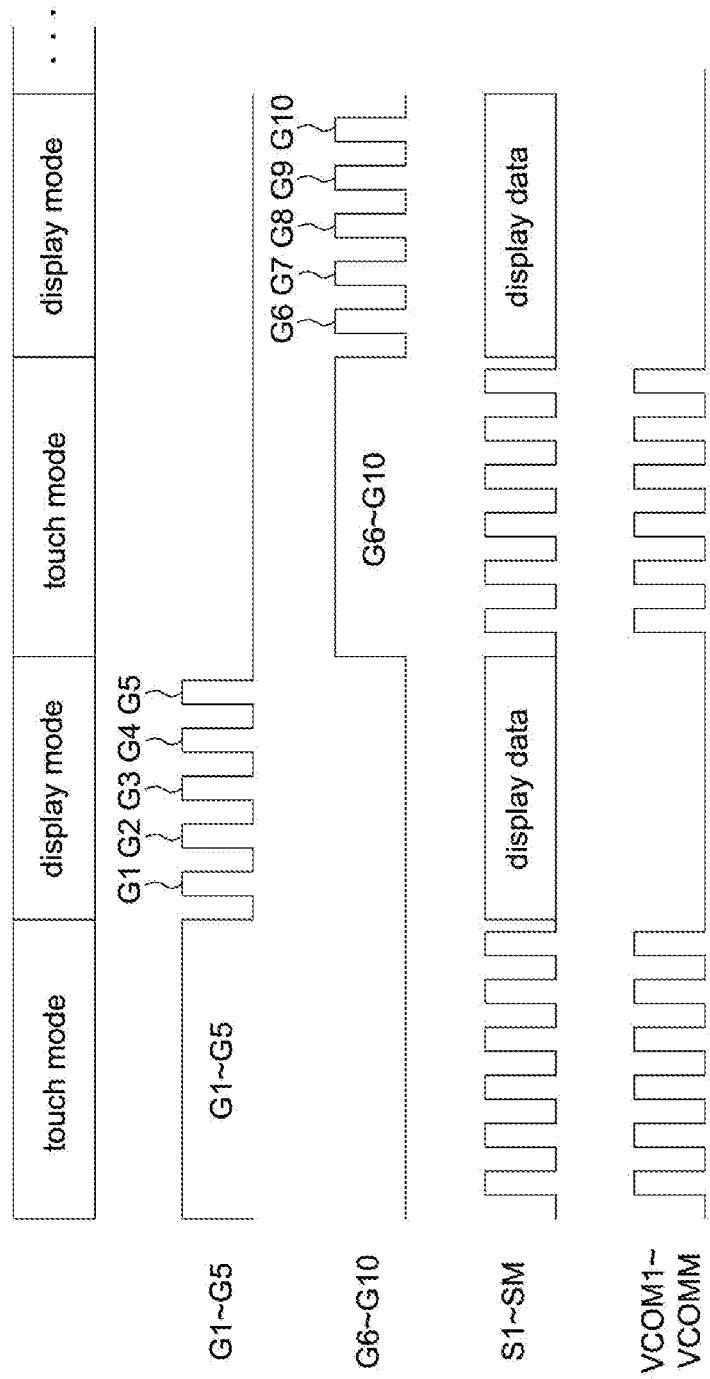
FIG. 3 is a schematic diagram of signals applied to common electrodes, gate lines and data lines in a display mode and in a touch mode according to an embodiment of the present invention.

The touch display panel 100 performs multiple operations alternately in the display mode and the touch mode during a display period of one frame. When operating in the display mode, the touch display panel 100 displays image data; when operating in the touch mode, the touch display panel 100 detects whether a touch event occurs thereupon. More specifically, referring to FIGS. 1 to 3, FIG. 3 shows a schematic diagram of signals applied to common electrodes, gate lines and data lines in a display mode and in a touch mode according to an embodiment of the present invention. It should be noted that, FIG. 3 depicts only the driving method of a part of the gate lines, the gate lines G1 to GN are divided into multiple groups each comprising 5 gate lines. It should be noted that the above is an example for explaining the present invention, and is not to be construed as a limitation to the present invention. In FIG. 3, the touch display panel 100 and the driving circuit operate in the touch mode firstly. At this point, the gate driver 130_1 simultaneously turns on the gate lines G1 to G5 in the pixel array 110, such that the TFTs of the pixels on the gate lines G1 to G5 are in a turned on state. Meanwhile, a touch driving signal having a toggle pattern is inputted into the nodes N2 of the touch control circuits 220_1 to 220_K in the source driving circuits 120_1 to 120X, such that the touch driving signal is transmitted to the data lines S1 to SM via the nodes N1 and the multiplexing circuit 202. At this point, the touch control circuits 220_1 to 220_K are allowed to detect whether a touch event occurs on regions of the gate lines G1 to G5 and the data lines S1 to SM according to the capacitance changes on the nodes Nout. In another embodiment, the signal waveform of the touch driving signal may be switched among three or more voltage levels, and the voltages on the corresponding gate lines and data lines also change along with the waveform of the touch driving signal. In yet another embodiment, the signal waveform of the touch driving signal may be a sinusoidal wave, and the voltages on the corresponding gate lines and data lines also change along with the waveform of the touch driving signal.

The common electrode control circuit 140 also synchronously controls the common electrodes VCOM1 to VCOMM, and causes these common electrodes VCOM1 to VCOMM to have a signal waveform identical to that of the touch driving signal of the corresponding data lines (having the same voltage changes), so as to prevent effects of capacitance loading between the common electrodes VCOM1 to VCOMM and the data lines S1 to SM, thereby enhancing the touch detection accuracy of the touch control circuits 220_1 to 220_K.

Further, as the gate lines G1 to G5 are simultaneously turned on in the touch mode, the voltage values of the pixel electrodes of the pixels on the gate lines G1 to G5 are cleared. Thus, the touch display panel 100 and the driving circuit need to immediately operate in the display mode after the touch mode, so as to immediately write the display data into the pixels on the gate lines G1 to G5. More specifically, in the display mode, the gate driver 130_1 sequentially turns on the gate lines G1 to G5 (only one gate line is turned on at a time), and the display data generating circuit 210 writes the display data into the pixels associated with the gate lines G1 to G5 via the multiplexing circuit 202 and the data lines S1 to SM. As previously described, as the operating time in the touch mode is extremely short and the lost display data is immediately written in the closely following display mode, the issue of perceiving such by a user and viewing discomfort of the user can be eliminated.

Next, the touch display panel 100 and the driving circuit again operate in the touch mode. At this point, the gate driver 130_1 simultaneously turns on the gate lines G6 to G10 in the pixel array 110, such that the TFTs in the pixels on the gate lines G6 to G10 are in a turned on state. Meanwhile, the touch driving signal having a toggle pattern is inputted to the nodes N2 of the touch control circuits 220_1 to 220_K in the source driving circuits 120_1 to 120_X, such that the touch driving signal is transmitted to the data lines S1 to SM via the nodes N1 and the multiplexing circuit 202. At this point, the touch control circuits 220_1 to 220_K may detect whether a touch event occurs on regions of the gate lines G6 to G10 and the data lines S1 to SM according to the capacitance changes on the nodes Nout. Meanwhile, the common electrode control circuit 140 also synchronously controls the common electrodes VCOM1 to VCOMM to have a signal waveform identical as that of the touch driving signal.

Similarly, the voltage values of the pixel electrodes of the pixels on the gate lines G6 to G10 are cleared. Thus, the touch display panel 100 and the driving circuit need to immediately operate in the display mode after the touch mode, so as to immediately write the display data into the pixels on the gate lines G6 to G10. More specifically, in the display mode, the gate driver 130_1 sequentially turns on the gate lines G6 to G10 (only one gate lines is turned on at a time), and the display data generating circuit 210 writes the display data into the pixels on the gate lines G6 to G10 via the multiplexing circuit 202 and the data lines S1 to SM.

Next, the touch display panel 100 and the driving circuit constantly repeat operating in the touch mode and the display mode until touch detection and image display of one entire frame are complete.

Further, it should be noted that, in the embodiment in FIG. 3, in the touch mode, the common electrodes VCOM1 to VCOMM have the identical signal waveform to that of the touch driving signal inputted into the data lines S1 and SM. However, the present invention is not limited to such example. In other embodiments of the present invention, the common electrodes VCOM1 to VCOMM may have a signal waveform that is partially the same as that of the touch driving signal instead of having a completely identical waveform. For example, the timing of the waveform change may be the same while the change in the amplitude is not entirely the same, or the change in the amplitude is the same while the timing of the waveform change is not entirely the same. Variations in these embodiments may also alleviate the noise interference caused by the common electrodes to further enhance the touch detection accuracy. Thus, it should be noted that, associated design modifications are to be encompassed within the scope of the present invention.

Figure 4:
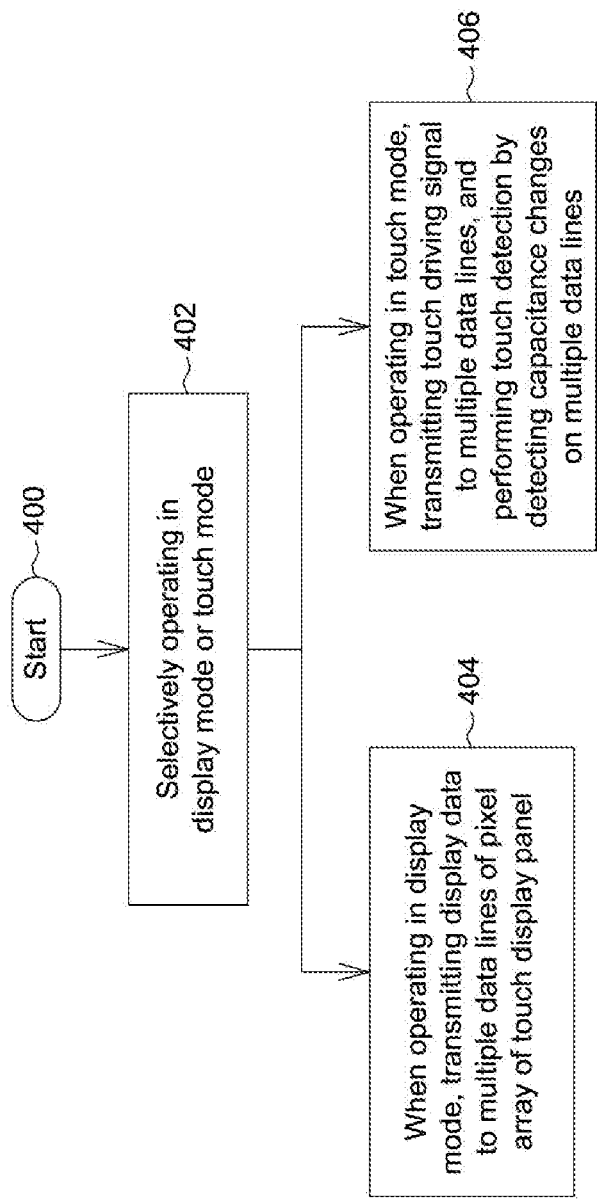
FIG. 4 is a flowchart of a driving method for a touch control panel according to an embodiment of the present invention.

FIG. 4 shows a flowchart of a driving method for a touch display panel according to an embodiment of the present invention. Referring to FIGS. 1 to 4, the process in the flowchart includes following steps.

In step 400, the process begins.

In step 402, the touch display panel selectively operates in a display mode or in a touch mode.

In step 404, when the touch display panel operates in the display mode, display data is transmitted to multiple data lines of a pixel array of the touch display panel.

In step 406, when the touch display panel operates in the touch mode, a touch driving signal is transmitted to the multiple data lines, and touch detection is performed by detecting capacitance changes on the multiple data lines.

One example is given below for illustrating the above embodiment. Taking a 4-inch touch display panel having a resolution of 1280*720 for instance, the touch display panel includes 1280 gate lines and 720*3 data lines. Assuming that the required touch detection precision is 5 mm, these 1280 gate lines may be divided into 22 groups. Basically, each of the groups includes 58 gate lines, whereas the remaining 4 gate lines may be connected to a common voltage level or merged into other groups. Assuming that the frame rate of the touch display panel is 60 Hz, the display period of each frame is approximately 16.6 ms, and the total period of each of the groups operating in the touch mode and in the display mode is approximately 755 μs (16.6 ms/22~755 μs). Further, in one example, the period of each of the groups operating in the touch mode may be 200 μs, and the period of each of the groups operating in the display mode may be 555 μs. That is, the driving period of each gate line in the display mode is approximately 9.6 μs. Thus, in this example, the operating timing of the touch display panel is: 1) simultaneously turning on the 58 gate lines in the first group, and connecting the data lines to the touch control circuits 220_1 to 220_K in a period of 200 μs to perform touch detection; 2) turning off the 58 gate lines in the first group; 3) sequentially turning on the 58 gate lines in the first group in a period of 9.6 μs, and connecting the data lines to the display data generating circuit 210 to write the display data into the pixel electrodes on these 58 gate lines; and 4) repeating steps (1) to (3) to perform the operation of the 58 gate lines of the next group till the last group.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A driving circuit for a touch display panel, that selectively operates in a display mode or in a touch mode, the driving circuit comprising:
a display data generating circuit, that transmits display data to a plurality of data lines of a pixel array of the touch display panel when the driving circuit operates in the display mode;
a touch control circuit, that transmits a touch driving signal to the plurality of data lines and performs touch detection by detecting capacitance changes on the plurality of data lines when the driving circuit operates in the touch mode; and
a common electrode control circuit configured to control at least a part of a common electrode of the touch display panel to have a signal waveform on the at least the part of the common electrode to be identical to a corresponding signal waveform of the touch driving signal when the driving circuit operates in the touch mode, and further configured to control providing a zero signal to the at least the part of the common electrode when the driving circuit operates in the display mode.

2. The driving circuit according to claim 1, wherein in a display period of display data of one frame, the driving circuit alternately switches between the touch mode and the display mode for a plurality of times.

3. The driving circuit according to claim 2, wherein in the display period of the display data of one frame, each time when the driving circuit operates in the touch mode, the driving circuit simultaneously turns on a plurality of gate lines in the pixel array, and the touch circuit transmits the touch driving signal to the plurality of data lines and performs touch detection by detecting the capacitance changes on the plurality of data lines.

4. The driving circuit according to claim 3, wherein, after the driving circuit simultaneously turns on the plurality of gate lines in the pixel array, and the touch circuit transmits the touch driving signal to the plurality of data lines and performs touch detection by detecting the capacitance changes on the plurality of data lines, the driving circuit switches to the display mode and sequentially turns on the plurality of gate lines, and the display data generating circuit sequentially transmits the display data corresponding to the pixels on the plurality of gate lines to the plurality of data lines.

5. The driving circuit according to claim 2, wherein the gate lines in the pixel array are divided into a plurality of groups each comprising a plurality of gate lines; and in the display period of the display data of one frame, for each group, the driving circuit first operates in the touch mode, and the driving circuit simultaneously turns on the plurality of gate lines in the group, transmits the touch driving signal to the plurality of data lines, and performs touch detection by detecting the capacitance changes on the plurality of data lines; and the driving circuit immediately operates in the display mode and sequentially turns on the plurality of gate lines in the group, and the display data generating circuit sequentially transmits the display data corresponding to the pixels on the plurality of gate lines to the plurality of data lines.

6. A driving method for a touch display panel, comprising:
selectively operating in a display mode or in a touch mode;
when operating in the display mode, transmitting display data to a plurality of data lines of a pixel array of the touch display panel and controlling providing a zero signal to at least a part of a common electrode of the touch display panel; and
when operating in the touch mode, transmitting a touch driving signal to the plurality of data lines, performing touch detection by detecting capacitance changes on the plurality of data lines and controlling the at least the part of the common electrode of the touch display panel to have a signal waveform on the at least the part of the common electrode to be identical to a corresponding signal waveform of the touch driving signal.

7. The driving method according to claim 6, further comprising:
in a display period of display data of one frame, alternately switching between the touch mode and the display mode for a plurality of times.

8. The driving method according to claim 7, further comprising:
in the display period of the display data of one frame, each time when operating in the touch mode, simultaneously turning on a plurality of gate lines in the pixel array, transmitting the touch driving signal to the plurality of data lines, and performing touch detection by detecting the capacitance changes on the plurality of data lines.

9. The driving method according to claim 8, after the step of simultaneously turning on the plurality of gate lines in the pixel array, transmitting the touch driving signal to the plurality of data lines and performing touch detection by detecting the capacitance changes on the plurality of data lines, the driving method further comprising:
switching to the display mode, sequentially turning on the plurality of gate lines, and sequentially transmitting the display data corresponding to the pixels on the plurality of gate lines to the plurality of data lines.

10. The driving method according to claim 7, the gate lines in the pixel
array being divided into a plurality of groups each comprising a plurality of gate lines, the driving method further comprising:
in the display period of the display data of one frame, for each group, first operating in the touch mode, simultaneously turning on the plurality of gate lines in the group, transmitting the touch driving signal to the plurality of data lines, and performing touch detection by detecting the capacitance changes on the plurality of data lines; and
immediately operating in the display mode, sequentially turning on the plurality of gate lines in the group, and sequentially transmitting the display data corresponding to the pixels on the plurality of gate lines to the plurality of data lines.

11. A touch display panel, comprising:
a pixel array;
a common electrode, disposed on the pixel array; and
a driving circuit, coupled to the pixel array and the common electrode, selectively operating in a display mode or a touch mode;
wherein, when the driving circuit operates in the display mode, the driving circuit transmits display data to a plurality of data lines in the pixel array and controls providing a zero signal to at least a part of a common electrode of the touch display panel; and
when the driving circuit operates in the touch mode, the driving circuit transmits a touch driving signal to the plurality of data lines performs touch detection by detecting capacitance changes on the plurality of data lines, and controls the at least the part of the common electrode of the touch display panel to have a signal waveform on the at least the part of the common electrode to be identical to a corresponding signal waveform of the touch driving signal.

12. The touch display panel according to claim 11, wherein in a display period of display data of one frame, the driving circuit switches alternately between the touch mode and the display mode for a plurality of times.

13. The touch display panel according to claim 12, wherein in the display period of the display data of one frame, each time when the driving circuit operates in the touch mode, the driving circuit simultaneously turns on a plurality of gate lines in the pixel array, and the touch circuit transmits the touch driving signal to the plurality of data lines and performs touch detection by detecting the capacitance changes on the plurality of data lines.

14. The touch display panel according to claim 13, wherein, after the driving circuit simultaneously turns on the plurality of gate lines in the pixel array, and the touch circuit transmits the touch driving signal to the plurality of data lines and performs touch detection by detecting the capacitance changes on the plurality of data lines, the driving circuit switches to the display mode and sequentially turns on the plurality of gate lines, and the display data generating circuit sequentially transmits the display data corresponding to the pixels on the plurality of gate lines to the plurality of data lines.

15. The touch display panel according to claim 12, wherein the gate lines in the pixel array are divided into a plurality of groups each comprising a plurality of gate lines; and in the display period of the display data of one frame, for each group, the driving circuit first operates in the touch mode, and the driving circuit simultaneously turns on the plurality of gate lines in the group, transmits the touch driving signal to the plurality of data lines, and performs touch detection by detecting the capacitance changes on the plurality of data lines; and the driving circuit immediately operates in the display mode and turns on the plurality of gate lines in the group, and the display data generating circuit sequentially transmits the display data corresponding to the pixels on the plurality of gate lines to the plurality of data lines.

* * * * *